Sept. 13, 1932.  L. H. MILLS  1,877,009
COOKING UTENSIL
Filed Feb. 1, 1930  2 Sheets-Sheet 1

INVENTOR
Lewis H. Mills
BY
Smith & Tuck
ATTORNEYS

Sept. 13, 1932. L. H. MILLS 1,877,009
COOKING UTENSIL
Filed Feb. 1, 1930   2 Sheets-Sheet 2

INVENTOR
Lewis H. Mills
BY
Smith & Tuck
ATTORNEYS

Patented Sept. 13, 1932

1,877,009

UNITED STATES PATENT OFFICE

LEWIS H. MILLS, OF SEATTLE, WASHINGTON, ASSIGNOR TO NEVERBURN COOKER CO., OF SEATTLE, WASHINGTON, A CORPORATION OF WASHINGTON

COOKING UTENSIL

Application filed February 1, 1930. Serial No. 425,185.

My present invention relates to the art of cooking utensils, and more particularly to that type of utensil which because of its unusual construction, lends itself to that style of cookery commonly referred to as waterless or pressure cookery. It is a well known and recognized fact that food stuffs which are cooked with the minimum amount of water added, and which are cooked in closed vessels, retain the natural flavor and minerals which are most often lost, or at least partially lost, when they are boiled or steamed in the usual manner.

Many utensils have been provided for this style of cookery and they are usually characterized by their massive construction, as they are normally made of cast metal, usually aluminum. These utensils, aside from being expensive as their construction necessarily entails, are heavy and difficult for the average housewife to handle. It is the principal object of my invention therefor:

To provide a cooking utensil which is adapted to waterless pressure cooking and which may be produced from light weight sheet metal.

Another object is to provide a cooking utensil consisting of a number of parts and, which permits the user to select those parts which will be necessary in the preparation of a single meal.

A still further object is the production of sauce and frying pans which, due to their peculiar construction, distribute the heat over their entire bottom surface so equally that it is very difficult to burn food in them, even though the water may entirely boil away. A further object is to provide a detachable handle which may be used with either the upper or lower member, or may be used to bind the two members together when they are used without an intermediate member.

Other and more specific objects will be apparent from the following description taken in connection with the accompanying drawings, wherein Figure 1 is a cross sectional view through my cooking device as it would be assembled for the cooking of an entire meal.

Figure 1:
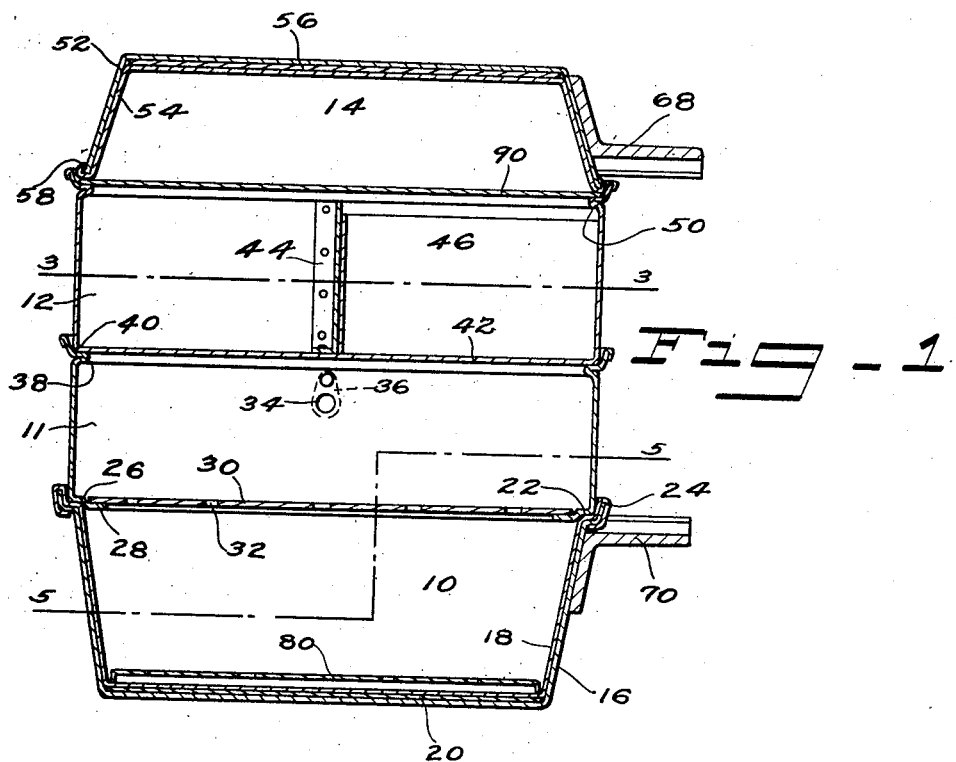
Figure 2:
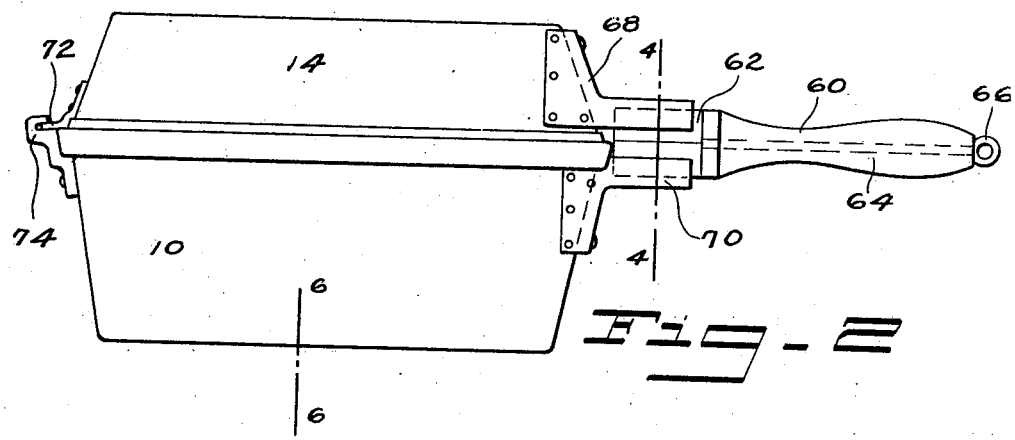
Figure 2 is an elevation showing my device as it would be used for roasting, for instance, or for any other purpose where a covered pan is desired.
Figure 3:
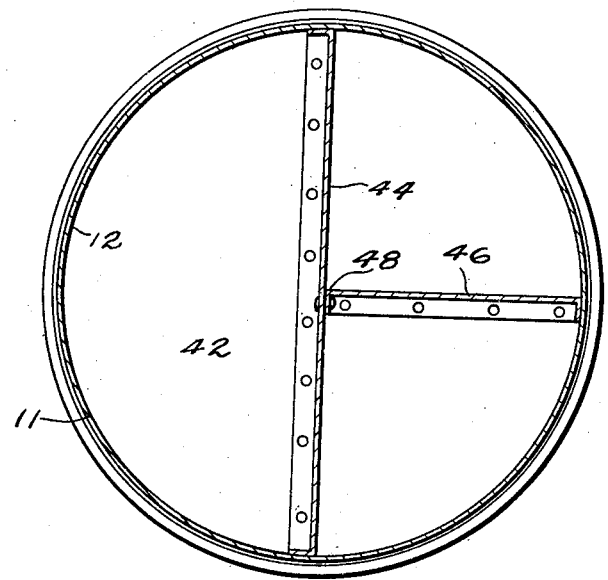
Figure 3 is a cross sectional view along the line 3—3 of Figure 1.
Figure 4:
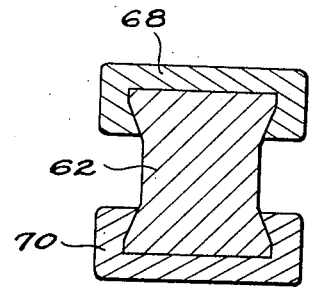
Figure 4 is a cross sectional view along the line 4—4 of Figure 2.
Figure 5:
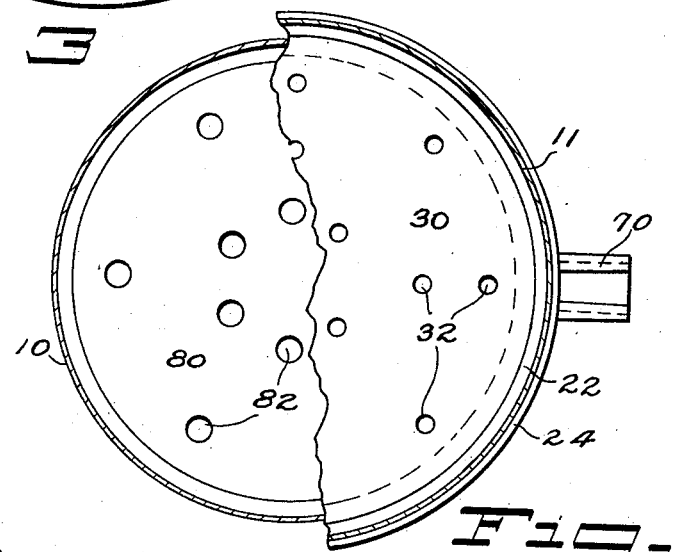
Figure 5 is a cross sectional view along the line 5—5 of Figure 1.
Figure 6:
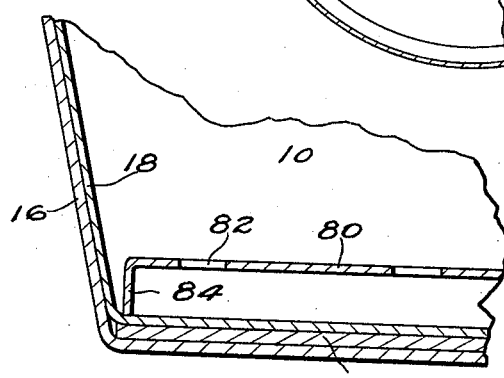
Figure 6 is a fragmentary cross sectional view along the line 6—6 of Figure 2.

Referring to the drawings throughout which like reference numerals indicate like parts, numeral 10 designates the lower pan member of my device. Coacting with member 10 are the intermediate members 11, 12 and the upper pan member 14. The lower pan 10 is constructed of two sheets of metal which are spun together consisting of the outer member 16 and the inner member 18. As these two members are put together for spinning a third member 20, which is a circular disc normally, or in case of a square utensil a square is inserted between them. The metal is then spun to approximately the shape shown in Figure 1, having an annular ledge 22, and having preferably the inner member 18 spun back on itself so as to include the upper edge 24 of member 18. This operation serves a dual function of joining the two members 16 and 18 so that they cannot come apart, and further, the extra metal at this point forms a rim which adds greatly to the rigidity of the pan 10 and makes it possible to use sheet stock of much thinner sheets than could be used in any other way. The ledge 22 is of such proportion that it is adaptable for the engagement of any of the members 11, 12, or 14. In Figure 1 I have shown member 11 as resting on this ledge. Intermediate member 11 has an annular inwardly extending ridge 26, a portion of which 28 is at a lower level and provides a centering seat for the removable bottom member 30. I prefer normally to provide member 30 with a plurality of perforations 32. This is to enable steam and vapor formed in the lower member 10 to readily pass upwardly into section 11, as I have often found it quite desirable to have a vent in this member and I have shown this as an orifice at 34, covered normally by a hinged cover 36. This vent is desirable for two reasons: first, it is often desirable to allow surplus moisture to escape; secondly, I have found that if the utensil is taken off the stove when hot and allowed to cool that it is often very difficult to remove these sections due to the vacuum created therein when the device is cooled. The upper end of member 11 is provided with an inwardly extending annular ledge 38 which provides a seat 40 which has the same inside dimensions as the ledge 22 of the lower member. Thus I believe it will be clear that any number of intermediate members might be used in my device. For sake of simplicity, however, I have only shown the one. Member 14, of course, might easily be used as a cover for member 11 when it is not desired to cook many articles at once. As shown in Figure 1 the intermediate section 12 is provided with a solid fixed bottom 42, and as a further convenience lending it to the purpose of cooking small amounts of a number of articles of food, I have provided the partitions 44 and 46. These partitions may be riveted in place as indicated in Figure 3, or they may be joined together at 48 and used as removable partitions. This is entirely satisfactory where no liquids are involved. As member 12 must necessarily have the same inwardly extending annular ledge 50 as provided in section 11, it is necessary that partition 44 be made of material that can be sprung sufficiently so that it may be put in place and allowed to spring back underneath the ledge 50. The upper member 14 has in general the same construction as the lower member 10 in that it is composed of two thin sheets of metal, 52 and 54, which are spun together to include the third metal member 56. The inner member 54 is bent back on itself at 58, and the outside measurement of this rim is small enough so that member 14 may be used on top of either member 11 or 12, or directly on top of the lower member 10 as shown in Figure 2. As a means of handling the utensil I prefer to use a detachable handle 60 which consists of a metal lug portion 62, a handle proper 64 of some nonconductive material as, for instance, bakelite or wood, which is held to member 62 by a through bolt 66. The lug portion 62 is adapted to engage the handle brackets 68 and 70 secured to member 14 and 10 respectively. The exact shape of this lug member is rather immaterial. Any shape that will provide a secure engagement of a detachable handle to members 10 and 14 will suffice. The type, however, as shown in Figure 4 has proven very satisfactory. This provides for a dove tail engagement. This, I believe it will be readily understood, can be used to engage either member 68 or 70 independently, or to engage both these members at once as is shown in Figure 2. In this latter case I prefer to use an outwardly extending lug 72 secured to member 14 and a hooklike member 74 secured to the lower section 10. With this arrangement and the fact that the upper portion fits inside of the lower portion, a very secure locking means is provided.

It will be further observed that on the joints where the various sections join together the uppermost section fits inside of its supporting section, thus any condensation will drain downwardly and thus keep the outside of the utensil clean. I have further found that it is often necessary to support articles to be cooked in the lower section in such a way that they will not come in direct contact with the bottom of member 10. This I accomplish by a removable plate 80 which is preferably perforated as at 82 and has a downwardly disposed annular bead 84 which serves to space plate 80 away from the bottom of member 10. As a still further convenience I prefer to supply my utensil with one or more removable plates 90. These may be either perforated or solid according to the conditions under which they are to be used.

The foregoing description and the accompanying drawings clearly disclose a preferred embodiment of my invention but it will be understood that this disclosure is merely illustrative and that such changes in the invention may be made as are fairly within the scope and spirit of the following claims.

What I claim is:—

A cooking utensil consisting of a lower pan formed of two thicknesses of sheet metal, a third heat distributing sheet included between said two sheets; an inverted upper pan of similar construction; intermediate vessel members positioned between said upper and lower pans; an annular ledge formed on said lower pan adapted to receive said intermediate members or said upper pan; an annular ledge formed on said intermediate members adapted to receive another intermediate member or said upper pan; divisional partitions in one or more of said intermediate members; handle brackets secured to said upper and lower pan members and a detachable handle adapted to engage either member separately or both at the same time when said pans are used without intermediate members.

In witness whereof, I hereunto subscribe my name this 13th day of January A. D. 1930.

LEWIS H. MILLS.